Feb. 4, 1941. C. C. S. HENZE 2,230,456
FISHING SINKER
Filed Nov. 30, 1939
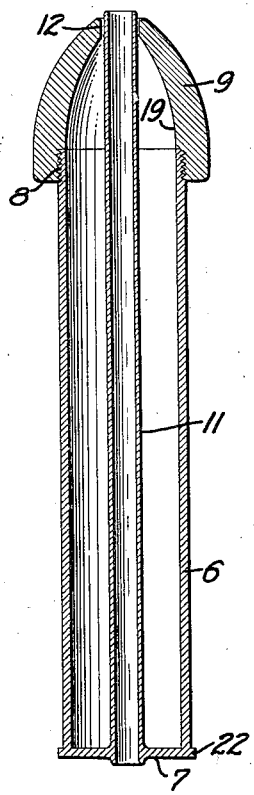
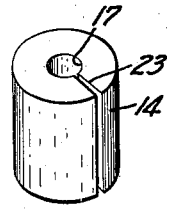
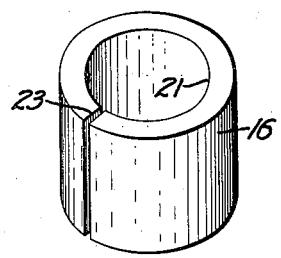
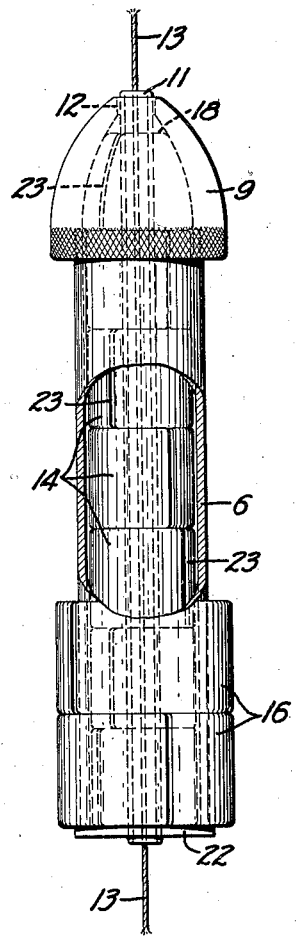
INVENTOR
Carl Christoffsteven Henze
BY
Harry Schroeder
ATTORNEY Patented Feb. 4, 1941

2,230,456

UNITED STATES PATENT OFFICE 2,230,456

FISHING SINKER

Carl Christoff Steven Henze, Oakland, Calif.

Application November 30, 1939, Serial No. 306,799

1 Claim. (Cl. 43—52)

This invention relates to weights which are attached to the submerged ends of fishing lines and are commonly called sinkers.

It is an object of the invention to provide a sinker whose weight may be adjustably varied.

Another object of the invention is to provide, in a sinker which is adapted to be positioned relatively concentric with, and slidable axially of, a fishing line, additional weighted members which may be added, and secured, to the sinker in concentric relation therewith and which are provided with means for permitting said weighted members to be positioned relatively concentric with the fishing line prior to their attachment to the sinker.

The invention possesses other objects and features of advantage, some of which, together with the foregoing, will be specifically set forth in the detailed description of the invention hereunto annexed. It is to be understood that the invention is not to be limited to the specific form thereof herein shown and described as various other embodiments thereof may be employed within the scope of the appended claim.

Referring to the drawing:

Figure 1 is a vertical sectional view taken medially and longitudinally through the assembled casing and retainer nut forming part of the improved sinker of my invention.

Figure 2 is a perspective view of one of the interior weights.

Figure 3 is a perspective view of one of the exterior weights.

Figure 4 is a front elevational view of a substantially complete sinker of my invention showing its relation to a fishing line. A portion of the view is broken away so as to more clearly disclose the internal construction.

During changes of tide, particularly at the ebb, the water currents move with considerable and increasing velocity. During such times the fisherman, in order to insure that his baited hooks are maintained in a desired position on the bottom, must increase the weight of the sinker being used in proportion to the strength of the water current so that the water flow will not drag the sinker and stir up sediment which will surround the bait with muddy water and thereby obscure the bait from the fish to be caught. Usually during a period of swift current it is necessary for the fisherman to change sinkers numerous times. To a person equipped with a graded assortment of sinkers this entails no more bother than removing the lighter sinker and replacing it with a desired heavier one. However since few ordinary fishermen carry a large assortment of sinkers, the usual procedure is to use two lighter sinkers together to obtain the desired weight. This is quite bothersome since the clip with which most fishing leaders are equipped is large enough to accommodate but a single sinker with the result that an additional sinker must be tied on. This is time-consuming and, when it is necessary several times in a short interval, seriously taxes the fisherman's patience. In addition, the coupling of two or more sinkers together increases the area of the composite sinker exposed to the air so that the added wind resistance, during casting, materially reduces the length of cast obtainable if but a single sinker were used. I have obviated these undesirable features by providing a sinker whose weight may be adjustably varied to any degree desired in but a few moments thereby materially extending the time when active fishing may be done.

In detail, I provide a tubular casing 6 closed at one end by a cover 7, preferably formed integrally therewith, and having screw threads 8 formed at the other end thereof which engage the threaded bore of a removable retainer nut 9. A sleeve 11 is secured at one end in the cover 7 and extends concentric with and axially along the casing and projects through an opening 12 formed concentrically of the retainer nut 9. The sinker shown in the drawing is the type referred to as a sliding sinker, that is, the sinker is mounted concentric with the fishing line or leader 13, the latter being freely slidable within the sleeve 11. It will be evident that the ordinary construction may be employed wherein the sleeve 11 is provided with an eye or swivel to which the line or leader may be securely tied, without departing from the spirit of the invention.

Preferably two types of weights 14 and 16 are provided which are constructed of lead, so as to provide the greatest weight in the minimum of volume, and are adapted to be detachably mounted on the sinker. The weight 14, as shown in Figure 2, is tubular in form, having a central bore 17 which is slightly larger in diameter than the sleeve 11 and an external diameter slightly less than the internal diameter of the casing 6. This permits, when the retainer nut 9 has been removed from the end of the casing, a number of the weights 14 to be inserted into the casing, as shown in Figure 4, in concentric relation with the casing and sleeve 11. The uppermost weight 18 of the group has an external contour modified from that of the others in that it is bullet-shaped to conform to the shape of the recess 19 within the retainer nut. The weight 16, shown in Figure 3, is also tubular in form and has a central bore 21 which is slightly larger than the external diameter of the casing 6 so that a number of the weights 16 may be slipped over the casing as shown in Figure 4. A flange 22, formed at the end of the casing opposite the retainer nut, serves as a stop, at one end of the casing, to retain the weights 16 while the retainer nut 9 serves as the stop at the opposite end of the casing. Preferably, and for the sake of convenience, the proportions of the weights 14 and 16 are made such that each will have approximately the same weight, preferably one ounce or an even fraction thereof, so that the user may readily know, by counting the weights added to or removed from the sinker, what the total weight of the sinker is.

Each of the weights 14, 16 and 18 is provided with a radially extending slot 23, opening into the central bores of the weights, so that when the sinker is in place upon the fishing line 13, as shown in Figure 4, the weights may be readily added to or removed from the sinker without starting them from one end of the line which would be necessary if the slots 23 were absent. It will be seen, upon inspection of Figure 4, that by removing the retainer nut 9, the weights mounted on the sinker may be individually passed from the casing 6 to a point beyond the threaded end thereof and then removed from the line 13 by passing the latter through the slots 23. Weights may be as readily added by first passing the line 13 through the slots 23, to bring the weights into concentric relation with the casing 6 or sleeve 11, moving the weights into engagement with the casing or sleeve, and then replacing the retainer nut 9.

Having thus described my invention in detail, what I claim as novel and desire to secure by Letters Patent is:

A fishing sinker comprising a pair of relatively concentric tubular members, one of said tubular members being adapted to be mounted concentrically on and in axially slidable relation with a fishing line and the other of said tubular members having a flange at one end and screw threads at the other end thereof, a first tubular weight having therein a radially extending slot through which said fishing line may be passed to a position axially concentric with said weight, said first weight being engageable in telescopic relation with said first tubular member, a second tubular weight having therein a radially extending slot through which said fishing line may be passed to a position axially concentric with said weight, said second weight being engageable in telescopic relation with said second tubular member, and a retainer nut threadedly engaged with the threaded end of said second tubular member for holding the respective weights on said tubular members.

CARL CHRISTOFF STEVEN HENZE.